May 6, 1924. 1,492,696
T. W. MOERICKE
APPARATUS FOR HEATING AND COOLING LIQUIDS
Filed April 17, 1922 2 Sheets-Sheet 1
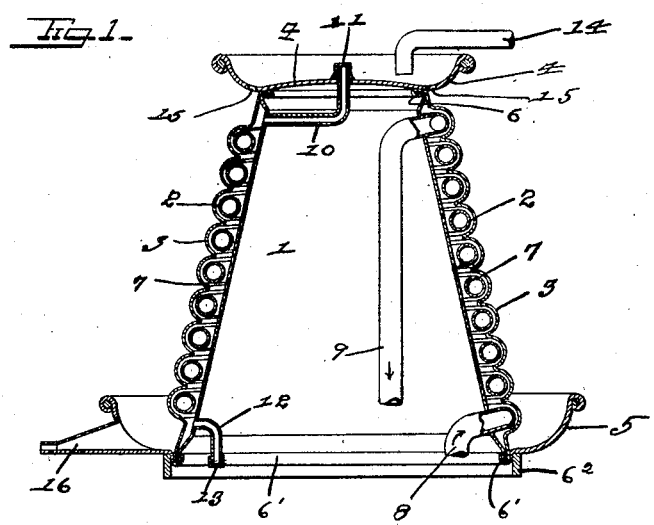
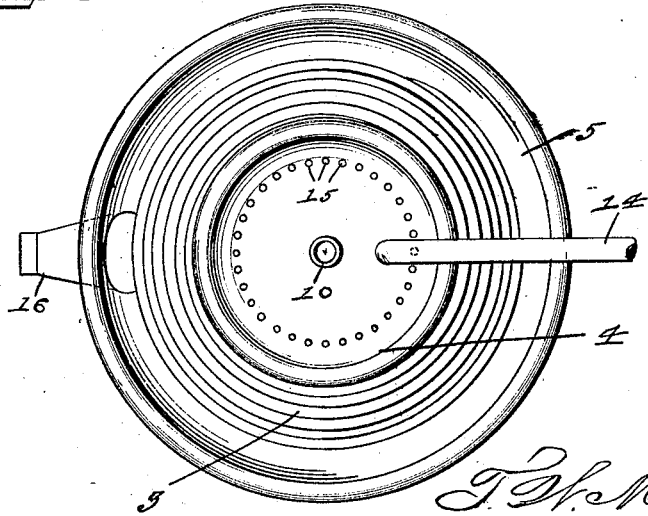
Witnesses
Ira M. Jones
M. E. Moore
Inventor
Attorney May 6, 1924.
T. W. MOERICKE
1,492,696
APPARATUS FOR HEATING AND COOLING LIQUIDS
Filed April 17, 1922   2 Sheets-Sheet 2
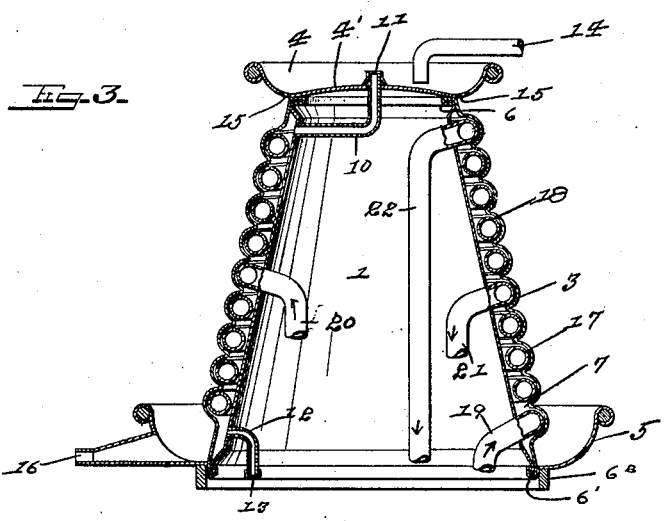
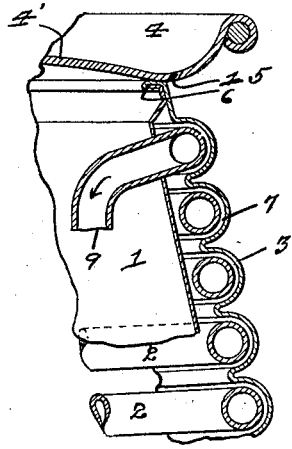
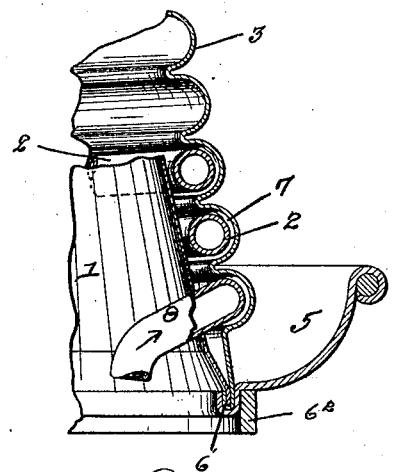

Patented May 6, 1924.

1,492,696

UNITED STATES PATENT OFFICE.

THEODORE W. MOERICKE, OF JANESVILLE, WISCONSIN.

APPARATUS FOR HEATING AND COOLING LIQUIDS.

Application filed April 17, 1922. Serial No. 554,160.

*To all whom it may concern:*

Be it known that I, THEODORE W. MOE-RICKE, a resident of Janesville, in the county of Rock and State of Wisconsin, a citizen of the United States, have invented certain new and useful Improvements in Apparatus for Heating and Cooling Liquids, of which the following is a specification.

My invention relates to an apparatus for cooling or otherwise treating milk or other liquids and comprises certain improvements hereinafter described whereby an apparatus more durable and more effective may be made than those heretofore in use, the present application being the same as that for which I made application on October 16, 1916, Serial No. 125,920, and allowed June 8, 1918.

The primary object of my invention is the provision of an apparatus of this character comprising few parts which will be capable of instant use and which will be cheap and inexpensive of production.

With the above and other objects in view which will appear as the description proceeds, the invention consists in the novel construction, combination and arrangement of parts, hereinafter described and claimed, it being understood that changes in the precise embodiment of the invention herein disclosed can be made without departing from the spirit of the invention.

In the accompanying drawings I have illustrated one complete example of the physical embodiment of my invention constructed according to the best mode I have so far devised for the practical application of the principles of my invention.

Figure 1 represents a vertical sectional view through my cooling or heating apparatus.

Figure 2 represents a top plan view thereof.

Figure 3 represents a vertical sectional view of a modified construction of my apparatus, in which there are more than one coil, permitting the use of more than one heating or cooling medium in the one machine or apparatus.

Figure 4 represents a sectional view of a portion of the top of my apparatus, and Figure 5 represents a similar view of a portion of the bottom of my apparatus.

The present embodiment of my invention may be said to consist broadly of the inner straight cone-shaped jacket 1, the spiral seamless pipe coil 2, on the outside thereof, the outer corrugated cone shaped casing 3, the corrugations of which register with the coils of the pipe 2, and the upper and lower receiving bowls 4 and 5, respectively. The upper receiving bowl 4 is provided with an annular series of openings 15, in its bottom, discharging upon the outer side of the corrugated casing 3. The inner and outer jacket and casing having their ends secured together in water tight joints 6 and 6', thus converting the space 7, around the pipe coil 2, into a water or liquid compartment, said joint 6', engaging a ring or band 6², which supports the apparatus.

The spiral coil 2 contains the heating or cooling medium which has entrance thereto by means of the inlet 8, and circulates therethrough and passes out through the outlet 9, and the space 7 contains any desired liquid for making a connection between the coil and the outer casing to conduct the heat thereto, said space being filled through the inlet pipe 10 projecting up into the upper receiving bowl 4 and being closed by the cap 11, and is emptied by the outlet 12 having the cap 13 therefor.

While my apparatus is adapted for use in either cooling or heating liquids, in the following description of the operation, I will describe my invention in use for cooling, as it will be readily understood that the operation when used in heating liquids is practically the same as when used for cooling.

Thus it will be seen that the cooling medium, which may be cold water, brine, ammonia, or the like, circulates through the coil chilling the water or other liquid in the space 7, which in turn chills the outer corrugated casing 3, and that the milk is emptied into the receiving bowl 4 by the supply pipe 14, said bowl having the central raised portion 4', and then the milk passes through the series of inwardly inclined openings 15 in the lower portion of the bowl 4, onto the chilled spirals of the corrugated outer casing 3, down which it trickles in a more or less spiral movement, into the lower receiving bowl 5, and thence out the outlet 16, into any desired receptacle or container (not shown).

As sometimes it may be desirable to use more than one heating or cooling medium, I have illustrated in Figure 3, a form of my invention in which I replace the single coil 2 with the two separate coils 17 and 18, having the inlets 19 and 20 and the outlets 21 and 22, respectively. This construction allowing the use of both steam and hot water in heating the milk, or the use of two cooling mediums, as the case may be, one medium circulating in the lower coil 17 and the other circulating through the upper coil 18.

As it will be obvious to those skilled in the art to which an invention of this character appertains, if there was no liquid of any kind in the space 7, the cooling or heating would be reduced about 25 per cent for where there would be an air space between the coil and the corrugated casing, it would not heat or cool, as it would be impossible, without unnecessary expense to fit the casing over the coil tight enough to prevent there being any air space between the two.

Also the pipe coil being round and seamless will stand from 100 to 200 pounds pressure, whereas the present machines will stand only 25 to 50 pounds, and further the outer casing having no sharp corners, no soldered corners, and no direct pressure thereon, will outlast any of the machines now in use.

Thus it will be apparent that I provide an apparatus of this character which will be easy to clean, and which can be made so that one half of the apparatus can be used for one kind of heating or cooling medium and the other for another kind of heating or cooling medium and still have the outside casing and the inner jacket composed of one piece, wherein the apparatus now in use two separate machines would be necessary.

I claim:
1. The apparatus for heating or cooling liquids herein shown and described, consisting of an inner jacket, an outer spirally corrugated casing having its ends bent around and forming a water tight joint with the inner jacket, a spiral cooling pipe disposed between the casing and jacket, an inlet and outlet for said spiral pipe, a receiving bowl having discharge openings and connected to and resting on the upper joined ends of the jacket and casing, an inlet pipe leading from the bowl to the upper portion of the jacket, an outlet leading from the lower portion of the jacket, a bowl connected to the lower portion of the jacket and casing and having its edge bent around the joint of said casing and jacket, an outlet for said lower bowl, and a support on which said bowl rests.

2. The apparatus for heating or cooling liquids herein shown and described, consisting of the upper receiving bowl having discharge openings, the lower receiving bowl of increased size and formed with a discharge opening, the inner inclined straight walled jacket, the outer conical corrugated jacket, the ends of said inner and outer jacket and casing being connected by being bent together, a supply pipe leading to the upper bowl, an inlet pipe leading from said bowl to the chamber between the casing and jacket, the outlet leading from the lower portion of said chamber, and a coil disposed in said chamber between the jacket and casing.

In testimony whereof I hereunto affix my signature.

THEODORE W. MOERICKE.